(12) United States Patent
Nunokawa et al.

(10) Patent No.: US 8,107,193 B2
(45) Date of Patent: Jan. 31, 2012

(54) PERPENDICULAR MAGNETIC RECORDING HEAD

(75) Inventors: Isao Nunokawa, Kanagawa (JP); Mikito Sugiyama, Kanagawa (JP); Kikuo Kusukawa, Saitama (JP); Keizo Kato, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 148 days.

(21) Appl. No.: 12/756,958

(22) Filed: Apr. 8, 2010

(65) Prior Publication Data

US 2011/0249360 A1    Oct. 13, 2011

(51) Int. Cl.
*G11B 5/31* (2006.01)
(52) U.S. Cl. .................................. 360/125.08
(58) Field of Classification Search ............. 360/125.08
See application file for complete search history.

(56) References Cited

U.S. PATENT DOCUMENTS

| 5,473,491 | A | 12/1995 | Fujisawa et al. ............. 360/126 |
| 6,436,560 | B1 * | 8/2002 | Kato et al. ................. 428/811.5 |
| 7,180,705 | B2 * | 2/2007 | Matono et al. ........... 360/125.12 |
| 7,388,732 | B2 * | 6/2008 | Le ............................. 360/125.08 |
| 7,646,564 | B2 * | 1/2010 | Maruyama et al. ...... 360/125.07 |
| 7,889,456 | B2 * | 2/2011 | Jiang et al. ............... 360/125.08 |
| 2006/0098338 | A1 * | 5/2006 | Watabe et al. ................ 360/126 |
| 2006/0262453 | A1 | 11/2006 | Mochizuki et al. ............ 360/125 |
| 2007/0013918 | A1 | 1/2007 | Hauger et al. ................ 356/512 |
| 2007/0206323 | A1 | 9/2007 | Im et al. ......................... 360/126 |
| 2008/0218902 | A1 * | 9/2008 | Hosono et al. ........... 360/125.02 |
| 2009/0002896 | A1 | 1/2009 | Mallary et al. ................ 360/119 |
| 2009/0190270 | A1 * | 7/2009 | Chou et al. .................... 360/314 |

FOREIGN PATENT DOCUMENTS

| JP | 06/325321 | 11/1994 |
| JP | 07/021515 | 1/1995 |
| JP | 11/031306 | 2/1999 |
| JP | 2000/339621 | 12/2000 |
| JP | 2004/103204 | 4/2004 |
| JP | 2004/139676 | 5/2004 |
| JP | 2006/221786 | 8/2006 |
| JP | 2006/252620 | 9/2006 |
| JP | 2006/323899 | 11/2006 |
| JP | 2007-164935 | 6/2007 |
| JP | 2009/016024 | 1/2009 |

* cited by examiner

*Primary Examiner* — Mark Blouin
(74) *Attorney, Agent, or Firm* — Zilka-Kotab, PC

(57) ABSTRACT

According to one embodiment, a perpendicular magnetic recording head includes a main magnetic pole including a write magnetic pole layer for recording, the write magnetic pole layer comprising magnetic layers being antiferromagnetically coupled via a thin non-magnetic conductor layer between the magnetic layers, wherein the write magnetic pole layer for recording has a flare section which gradually widens in a height-wise direction of a throat height section. The main magnetic pole also includes a non-magnetic cap layer laminated above an uppermost layer of the write magnetic pole layer, the non-magnetic cap layer being textured to provide anisotropy, and a subsidiary magnetic pole layer for supplementing the recording laminated above the non-magnetic cap layer. The head also includes an auxiliary magnetic pole, a magnetic shield positioned via a non-magnetic layer on a trailing edge and both sides of the main magnetic pole in a track width direction, and a coil for generating a recording magnetic field.

12 Claims, 6 Drawing Sheets

Magnetized contours illustrating
the effect of texturing on magnetic film

Fig. 5

(a) changes in anisotropic magnetic field (Hk) with texturing measured magnetic film thickness: 10 nm
period: 12 nm (b) changes in coercive force (Hc) with texturing measured magnetic film thickness: 10 nm
period: 12 nm

Fig. 6

(a) Schematic diagram of texture processing (b) TEM observation of texturing floating surface direction of the element   side surface direction of the element

PERPENDICULAR MAGNETIC RECORDING HEAD

FIELD OF THE INVENTION

The present invention relates to data storage systems, and more particularly, this invention relates to a magnetic recording head which generates a recording magnetic field in a recording medium, and magnetic recording and playback devices on which the magnetic recording head is mounted.

BACKGROUND OF THE INVENTION

With the recent increased demand for high surface recording densities in excess of 1 TB/in$^2$, there is an additional demand for further miniaturization of the process of writing onto a magnetic recording medium. Along with this increased demand, there is a problem of heat fluctuation with magnetization caused by the instability of magnetized regions of the medium. The perpendicular magnetic recording system is a method of resolving this difficulty which records magnetized signals in a direction perpendicular to the medium. However, even with this perpendicular magnetic recording system, miniaturization of the single magnetic pole used for writing which generates a perpendicular recording magnetic field in the medium to increase the surface recording density means that it continues to be difficult to generate a vertical magnetic field sufficient to reverse the magnetism in the recording medium.

To supplement the inadequacy of the magnetic field strength for writing, there is a method of supplying magnetic flux to the write magnetic pole by providing a subsidiary magnetic pole which increases the volume of the magnetic body in the height wise direction the floating surface, and a method of shortening the throat height (the range which determines the width of the write magnetic pole) moving the saturation point of the magnetic field closer to the floating surface and ensuring the strength of the magnetic field. However, when the throat height is shortened, the flare section which concentrates the magnetic field generated by coil induction and brings it to the floating surface is also brought closer to the floating surface. The flare section has a shape which is long horizontally and has an angle of spread greater than about 90° to prevent erasure or deterioration of data due to residual magnetic flux after writing, but there is a difficulty in that the recording width increases relative to the geometrical width of the single pole used for writing because of magnetic field leakage from the flare section due to the shape anisotropy provided to ensure the magnetic domain remains parallel to the recording medium.

If the spread angle of the flare section is kept below 90° to reduce writing bleed caused by the spread of recording width due to leakage of magnetic flux, magnetic domain control in the main magnetic pole is a key issue with the shape of the flare section relative to the floating surface becoming long in a vertical direction, the magnetic domain moving in a direction perpendicular to the recording medium with the shape anisotropy, and the danger of erasure after writing with residual flux from the recording head erasing data in the recording medium.

A means of controlling the magnetic domain of the main magnetic pole has been disclosed in respect to erasure after writing. In the gazettes of Japanese Patent Nos. 1995-21515, 2000-339621, and 1999-31306, a method is disclosed of controlling the magnetic domain by texturing the surface of the lowest layer of the recording head. Moreover, Japanese Patent No. 2004-139676 discloses a method of controlling the magnetic domain of the main magnetic pole using a film in which there is a magnetic phase transition from a non-magnetic state to a magnetic state by irradiating different wavelengths on the trailing side of the main magnetic pole.

SUMMARY OF THE INVENTION

According to one embodiment, a perpendicular magnetic recording head includes a main magnetic pole, including a write magnetic pole layer for recording, the write magnetic pole layer comprising magnetic layers being antiferromagnetically coupled via a thin non-magnetic conductor layer between the magnetic layers, wherein the write magnetic pole layer for recording has a flare section which gradually widens toward a top of the main magnetic pole in a height-wise direction of a throat height section. The main magnetic pole also includes a non-magnetic cap layer laminated above an uppermost layer of the write magnetic pole layer, the non-magnetic cap layer being textured to provide anisotropy, and a subsidiary magnetic pole layer for supplementing the recording laminated above the non-magnetic cap layer. The head also includes an auxiliary magnetic pole, magnetic shields positioned via a non-magnetic layer on a trailing edge of the main magnetic pole and on both sides of the main magnetic pole in a track width direction, and a coil for generating a recording magnetic field.

In another embodiment, a method for manufacturing a perpendicular magnetic recording head includes sequentially laminating a magnetic layer and a non-magnetic conducting layer on a substrate, applying a texture by repeatedly irradiating the substrate with an ion beam in two directions, a first direction being a floating surface direction, and a second direction being rotated through 180° in a height wise direction, laminating a magnetic film to form a subsidiary magnetic layer, processing the magnetic film formed on the substrate to form a main magnetic pole, and forming a non-magnetic layer which surrounds the main magnetic pole followed by a magnetic layer which becomes a shield via the non-magnetic layer. The main magnetic pole includes a subsidiary magnetic pole formed via a magnetic layer section which causes the subsidiary magnetic pole layer to become thicker toward an upper portion of the subsidiary magnetic pole layer in a stepped or tapered fashion in a height wise direction from a floating surface facing a recording medium, and a write magnetic pole layer for recording having a throat height section and a flare section.

A magnetic recording playback device, according to one embodiment, includes a perpendicular magnetic recording medium, a motor which rotates the perpendicular magnetic recording medium, a magnetic head having a recording head and a playback head, and a head drive section which drives the magnetic head to a desired track position of the perpendicular magnetic recording medium. The recording head includes a main magnetic pole, an auxiliary magnetic pole, a magnetic shield positioned via a non-magnetic layer on a trailing edge of the main magnetic pole and on both sides of the main magnetic pole in a track width direction, and a coil for generating a recording magnetic field from the main magnetic pole. The main magnetic pole includes a subsidiary magnetic pole layer and a write magnetic pole layer for recording. The write magnetic pole layer for recording has a flare section which gradually widens toward a top in a height wise direction or a throat height section, the write magnetic pole layer for recording is provided with anisotropy via antiferromagnetic coupling of magnetic layers with a thin film non-magnetic body therebetween, and the main magnetic pole comprises laminated magnetic bodies having two different anisotropic magnetic field strengths. Also, the subsidiary magnetic pole layer has a section which widens in a stepped or tapered fashion in a height wise direction from a floating surface facing the perpendicular magnetic recording medium, and the subsidiary magnetic pole layer is provided with anisotropy through texturing.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a perpendicular magnetic recording head includes a write magnetic pole layer for recording, the write magnetic pole layer comprising magnetic layers being antiferromagnetically coupled via a thin non-magnetic conductor layer between the magnetic layers, wherein the main magnetic pole has a flare section which gradually widens toward a top of the main magnetic pole in a height-wise direction of a throat height section. The write magnetic pole layer also includes a non-magnetic cap layer laminated above an uppermost layer of the write magnetic pole layer, the non-magnetic cap layer being textured to provide anisotropy, and a subsidiary magnetic pole layer for supplementing the recording laminated above the non-magnetic cap layer. The head also includes an auxiliary magnetic pole, magnetic shields positioned via a non-magnetic layer on a trailing edge of the main magnetic pole and on both sides of the main magnetic pole in a track width direction, and a coil for generating a recording magnetic field.

In another general embodiment, a method for manufacturing a perpendicular magnetic recording head includes sequentially laminating a magnetic layer and a non-magnetic conducting layer on a substrate, applying a texture by repeatedly irradiating the substrate with an ion beam in two directions, a first direction being a floating surface direction, and a second direction being rotated through 180° in a height wise direction, laminating a magnetic film to form a subsidiary magnetic layer, processing the magnetic film formed on the substrate to form a main magnetic pole, and forming a non-magnetic layer which surrounds the main magnetic pole followed by a magnetic layer which becomes a shield via the non-magnetic layer. The main magnetic pole includes a subsidiary magnetic pole formed via a magnetic layer section which causes the subsidiary magnetic pole layer to become thicker toward an upper portion of the subsidiary magnetic pole layer in a stepped or tapered fashion in a height wise direction from a floating surface facing a recording medium, and a write magnetic pole layer for recording having a throat height section and a flare section.

A magnetic recording playback device, according to a general embodiment, includes a perpendicular magnetic recording medium, a motor which rotates the perpendicular magnetic recording medium, a magnetic head having a recording head and a playback head, and a head drive section which drives the magnetic head to a desired track position of the perpendicular magnetic recording medium. The recording head includes a main magnetic pole, an auxiliary magnetic pole, magnetic shields positioned via a non-magnetic layer on a trailing edge of the main magnetic pole and on both sides of the main magnetic pole in a track width direction, and a coil for generating a recording magnetic field from the main magnetic pole. The main magnetic pole includes a subsidiary magnetic pole layer, and a write magnetic pole layer for recording. The write magnetic pole layer for recording has a flare section which gradually widens toward a top in a height wise direction of a throat height section, the write magnetic pole layer for recording is provided with antiferromagnetic coupling of magnetic layers with a thin film non-magnetic body therebetween, and the main magnetic pole comprises laminated magnetic bodies having two different anisotropic magnetic field strengths. Also, the subsidiary magnetic pole layer has a section which widens in a stepped or tapered fashion in a height wise direction from a floating surface facing the perpendicular magnetic recording medium, and the subsidiary magnetic pole layer is provided with anisotropy through texturing.

It has been observed that if a spread angle of a flare section in a recording head is kept below about 90° to reduce writing bleed caused by the spread of the recording width due to leakage of magnetic flux, the shape of the flare section relative to the floating surface becomes long in a vertical direction with shape anisotropy, and the magnetic domain also moves in a direction perpendicular to the recording medium, causing the residual flux from the recording head to erase data in the recording medium.

Magnetic domain control in the main magnetic pole is a variable which can be controlled to prevent the erasure of data after writing due to residual flux in the main magnetic pole, and although the method of providing texture on the lowermost layer of a recording head is effective from the point of view of controlling the magnetic domain, it is undesirable with a shield-type perpendicular magnetic head because of the danger of magnetic gradient variation from the loss of flatness between the main magnetic pole and the shield. This unevenness occurs due to texture being transferred to the trailing side of the main magnetic pole, and the writing gradient for the recording medium being set by the magnetic shield on the trailing side positioned around the magnetic pole and the main magnetic pole via a non-magnetic layer.

In an attempt to reduce this unevenness while still preventing erasure of data, a perpendicular magnetic recording head is provided in one embodiment in which recording performance does not deteriorate despite using texture as an effective means of controlling the magnetic domain.

In one embodiment of a magnetic recording head, the main magnetic pole comprises a write magnetic pole layer and a subsidiary magnetic pole layer, the magnetic domain of the main magnetic pole being controlled using two different methods, the write magnetic pole applying magnetic uniaxial anisotropy through anti-ferromagnetic coupling via a non-magnetic thin-film conductor between the magnetic bodies, and the subsidiary magnetic pole layer applying physical uniaxial anisotropy through a texture applied to a non-magnetic cap layer laminated onto the trailing side of the write magnetic pole layer.

According to one embodiment, uniaxial anisotropy is magnetically applied to the main magnetic pole comprising a write magnetic pole layer and a subsidiary magnetic pole layer using two different methods. As the write magnetic pole layer which has uniaxial anisotropy because of magnetic coupling due to anti ferromagnetic coupling can maintain the flatness of the trailing side, the trailing shield gap is uniform, and gradient variation in the write magnetic field can be reduced. Uniaxial anisotropy is generated in the write magnetic pole layer through antiferromagnetic coupling after writing to the recording medium, preventing magnetic field leakage to the recording medium, but when the magnetic domain is fixed by the antiferromagnetic coupling, the write magnetic pole layer can no longer absorb local flux leakage because there is no magnetization from an external magnetic field. According to one embodiment, the leaking magnetic flux may be absorbed by the shield and the subsidiary magnetic pole layer, a magnetic body given uniaxial anisotropy through physical texture and located adjacent to the write magnetic layer. With magnetic flux absorbed by the subsidiary magnetic pole layer, in accordance with the texture the magnetic domain is controlled in parallel with the recording medium, preventing data erasure after writing due to leakage of magnetic flux to the recording medium.

Several embodiments are this able to provide a magnetic recording head which has a strong magnetic field strength without any erasure of data after writing due to leakage of the magnetic field from the main magnetic pole, offering a high magnetic gradient without compromising the flatness of the write magnetic pole layer on the trailing side, the provision of a subsidiary magnetic pole layer supplementing the strength of the magnetic field, the shield and the subsidiary magnetic pole layer absorbing the leaking flux during antiferromagnetic coupling of the write magnetic pole layer, with the residual flux of the subsidiary magnetic pole layer controlling the magnetic domain.

A magnetic head, according to one embodiment is described with reference to the figures. In the figures that follow, parts with an identical function are given the same reference number and label.

Figure 1:
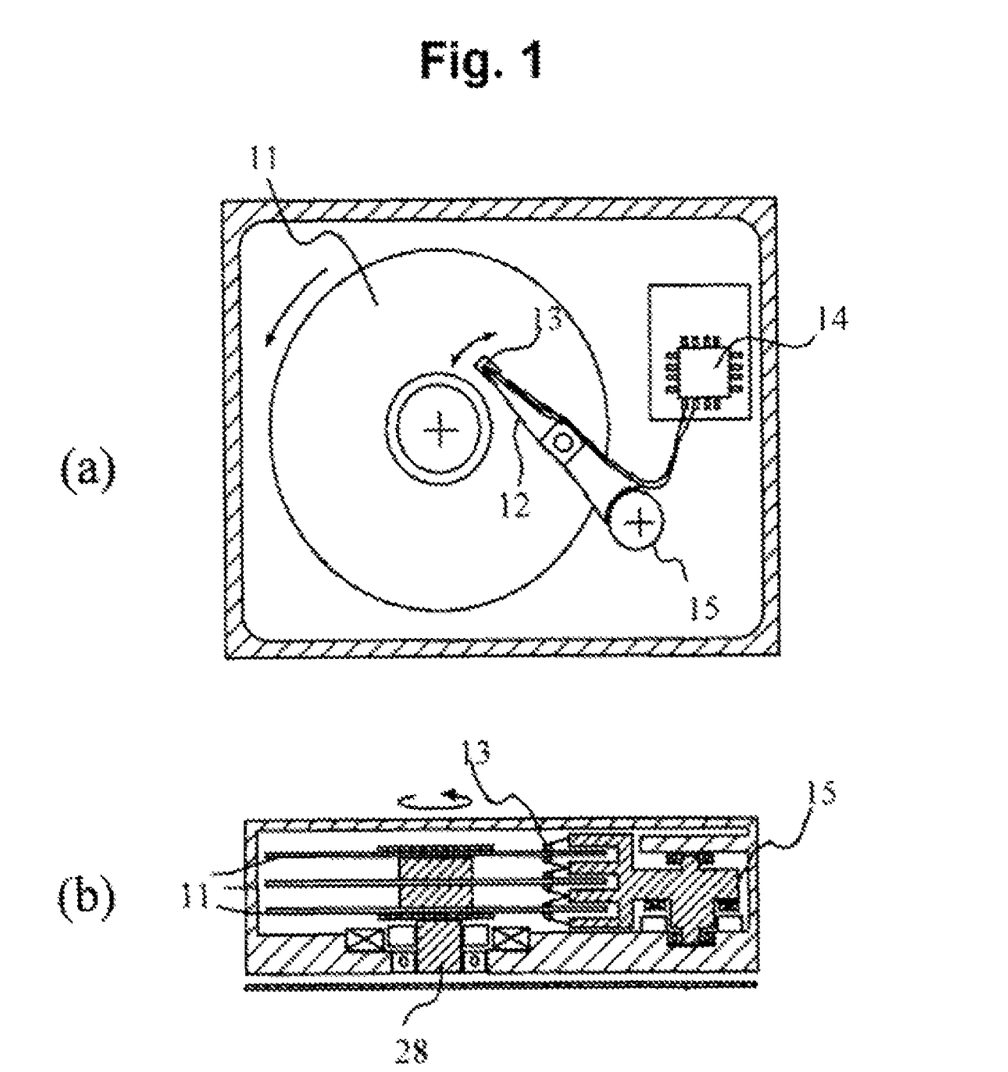
FIG. 1 is an outline drawing of a magnetic recording playback device, according to one embodiment.

FIG. 1 is a schematic diagram of a magnetic recording and playback device, according to one embodiment. A magnetic disk (perpendicular magnetic recording medium) 11 is rotatably driven by a motor 28. When data is input and output, a slider 13 which is fixed to the tip of a suspension arm 12 moves to the prescribed position on a rotating magnetic disk 11, to record or playback a magnetized signal using the thin-film magnetic head formed on the slider 13. By activating a rotary actuator 15, it is possible to select a position (track) on the radial dimension of the magnetic disk of the magnetic head. Signals read from or to be recorded on the magnetic head are processed in a signal processing circuit 14.

Figure 2:
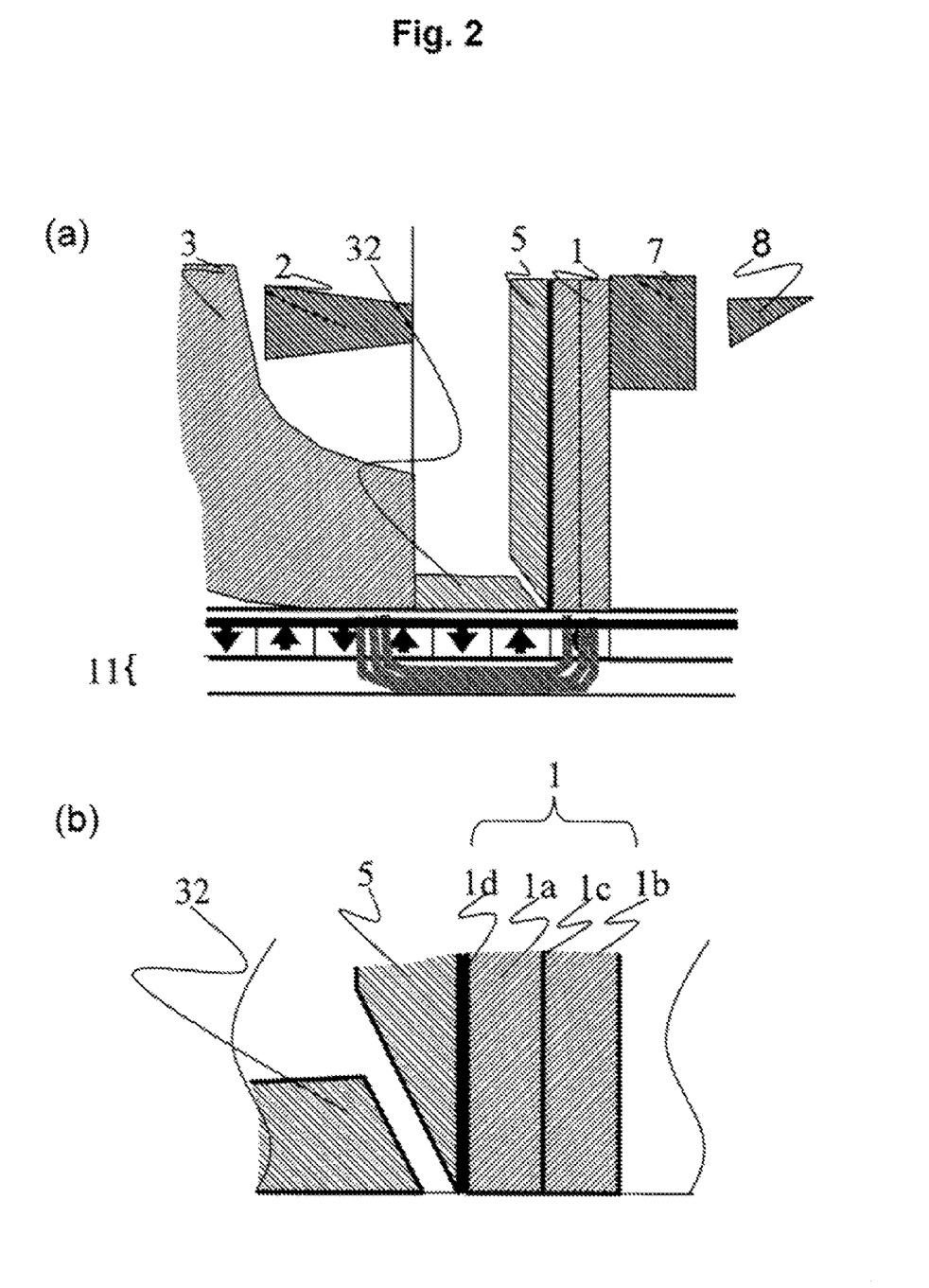
FIG. 2 is an enlarged schematic drawing and cross-section through the track centre of a magnetic recording head according to one embodiment.

FIG. 2(a) is a schematic cross-section view centered on a track, showing an example of the recording head, according to one embodiment, with FIG. 2(b) being an enlarged diagram showing the vicinity of the tip of the main magnetic pole on the side of the floating surface. With this recording head, a main magnetic yoke 7 and the main magnetic pole which comprises a write magnetic pole layer 1 and a subsidiary magnetic pole layer 5 are connected magnetically to a return pole 3 in a position separate from the floating surface, forming a magnetic circuit via the magnetic disk 11, this magnetic circuit being surrounded by a lower layer coil 8 and an upper layer coil 2. As shown in FIG. 2(b), the main magnetic pole has a structure comprising write magnetic pole layer 1 and subsidiary magnetic pole 5. Write magnetic pole layer 1 is laminated via non-magnetic thin film conductor 1c so that the second magnetic layer 1a and the first magnetic layer 1b are separated. Either a single layer film or a laminated film combining magnetic bodies with a high saturated flux density including at least two elements from Co, Ni and Fe may be used, according to one embodiment, in the second magnetic layer 1a and the first magnetic layer 1b as a combination of magnetic bodies which generate antiferromagnetic coupling. Although the strength of the antiferromagnetic coupling can be controlled by the relative film thickness of the second magnetic layer 1a and the first magnetic layer 1b, a method can also be used where strength is determined through a combination of multiple layers of the first magnetic layer 1b, the non-magnetic thin-film conductor 1c, and the second magnetic layer 1a.

With the non-magnetic thin-film conductor 1c, a thin film layer of Cr with a thickness of less than 1 nm may, for example, be used to create an antiferromagnetic coupling separate from the magnetic layer when flatness of the second magnetic layer 1b is desired.

Cap layer 1d of a non-magnetic thin-film to which a texture is applied is laminated on the trailing side of the write magnetic pole layer 1, according to one embodiment. The cap layer 1d is provided to protect the edge of this trailing side of the write magnetic pole layer 1, and even with texture applied to this cap layer 1d there is no effect on write performance. For example, it is possible to use a single layer or laminated layers of oxides and nitrides of Al, Si, Ta, Ti, etc., or a single layer or laminated layers of non-magnetic metals such as Cr, NiCr, Rh, Mo, Nb, Au, etc.

After stabilizing the structure with thermal processing, texture is applied to the non-magnetic thin-film cap layer 1d and the write magnetic pole layer 1 is laminated with the magnetic body of the subsidiary magnetic pole layer 5 which supplements any shortage in write magnetic field strength. Subsidiary magnetic pole layer 5 has a magnetic layer portion which progressively becomes thicker in a stepped or tapered fashion in the height wise direction (such as a height of the stack of elements) from the floating surface facing the recording medium 11, and is designed to ensure that the magnetic width of the write magnetic layer 1 does not spread.

The main magnetic pole comprised of write magnetic pole layer 1 and subsidiary magnetic pole layer 5 has a shield 32 formed on the floating surface side so as to surround the trailing side and both sides across the track width from three directions via a non-magnetic layer. The shield-type perpendicular magnetic recording head has a function which regulates bit shape, and shield 32 prevents the leakage of magnetic flux from the flare located in the height wise direction of the elements of the write magnetic pole layer 1 in the direction of track width, suppressing writing spread due to bleed, increasing the magnetic field gradient on the trailing side of write magnetic pole 1 in the direction of the trailing side, and suppressing curvature of the write width.

Figure 3:
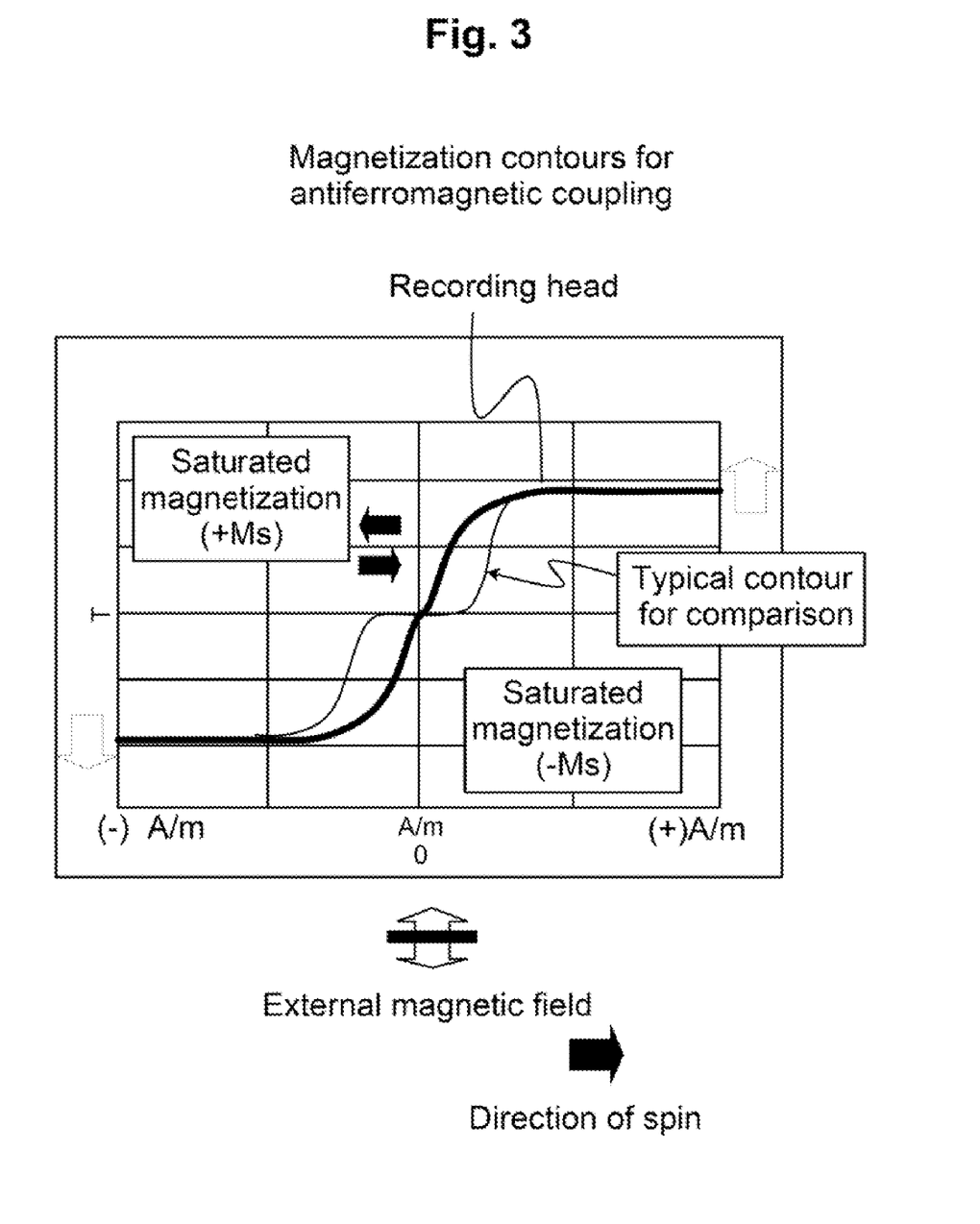
FIG. 3 shows magnetization contours for anti-ferromagnetic coupling, according to one embodiment.

FIG. 3 shows the externally applied magnetic field quantities, with magnetization contours for the anti-ferromagnetic coupling on write magnetic pole layer 1 shown on the horizontal axis and magnetization quantities on the vertical axis, according to one embodiment. The solid line in the diagram is the magnetization contour for the write magnetic pole layer 1 of the recording head, the dotted line showing a typical contour for comparison purposes.

The magnetization contour caused by antiferromagnetic coupling is described using a typical contour shown by the broken line in FIG. 3.

On the contour to the point where magnetic saturation is achieved in the magnetic body while sweeping the external magnetic field in the direction of the hard axis (where the magnetic field is applied externally perpendicularly to the direction of coupling of the magnetic body) the magnetic bodies enter an antiparallel state in the vicinity where the external magnetic field is 0 A/m. Because of the magnetic coupling, a magnetic volume of zero is maintained without being influenced by the external magnetic field. However, with an increase in the volume of the external magnetic field, magnetic coupling weakens and magnetization rotates completely through 90° and saturation is achieved. At this time, the external magnetic field with the saturated magnetization is an anisotropic magnetic field (the strength of the magnetic field in which the spin attempts to arrange itself in one direction).

As the external magnetic field in the recording head is an induced magnetic field caused by the conductive coil, an excessively large antiferromagnetic coupling causes the anisotropic magnetic field to increase, making it difficult for the spin of write magnetic pole layer 1 to rotate to the floating surface side, and restricting the discharge of flux so that writing to the recording medium is no longer possible; therefore, it is preferable that the antiferromagnetic coupling be cut off at about ±3183 A/m.

The strength of the antiferromagnetic coupling is determined by the laminated film thickness ratio of the magnetic bodies, according to one embodiment, which depends on the disparity in the materials of the first magnetic layer 1b and the second magnetic layer 1a of the write magnetic layer, as shown in FIG. 2(b). Antiferromagnetic coupling is achieved, in some approaches, by inserting a non-magnetic thin film conductor (of a suitable material, such as Cr) with a film thickness of 1 nm between the second magnetic layer 1a and the first magnetic layer 1b.

The difficulty with anti ferromagnetic coupling is that when magnetic coupling occurs, the magnetization drops to zero and the external magnetic field has no effect, making it impossible to discharge or absorb flux from the surroundings.

When applied to the subsidiary magnetic pole layer 5, as the laminated film thickness ratio changes in the magnetic layer portion where the film thickness changes in a stepped or tapered fashion in the height wise direction of elements from the floating surface facing the recording medium, the anti ferromagnetic coupling is cut off and there are regions where the magnetic domain is not controlled.

The control of the magnetic domain using texture applied with an ion beam to the subsidiary magnetic pole layer 5 is described with reference to FIG. 4.

Figure 4:
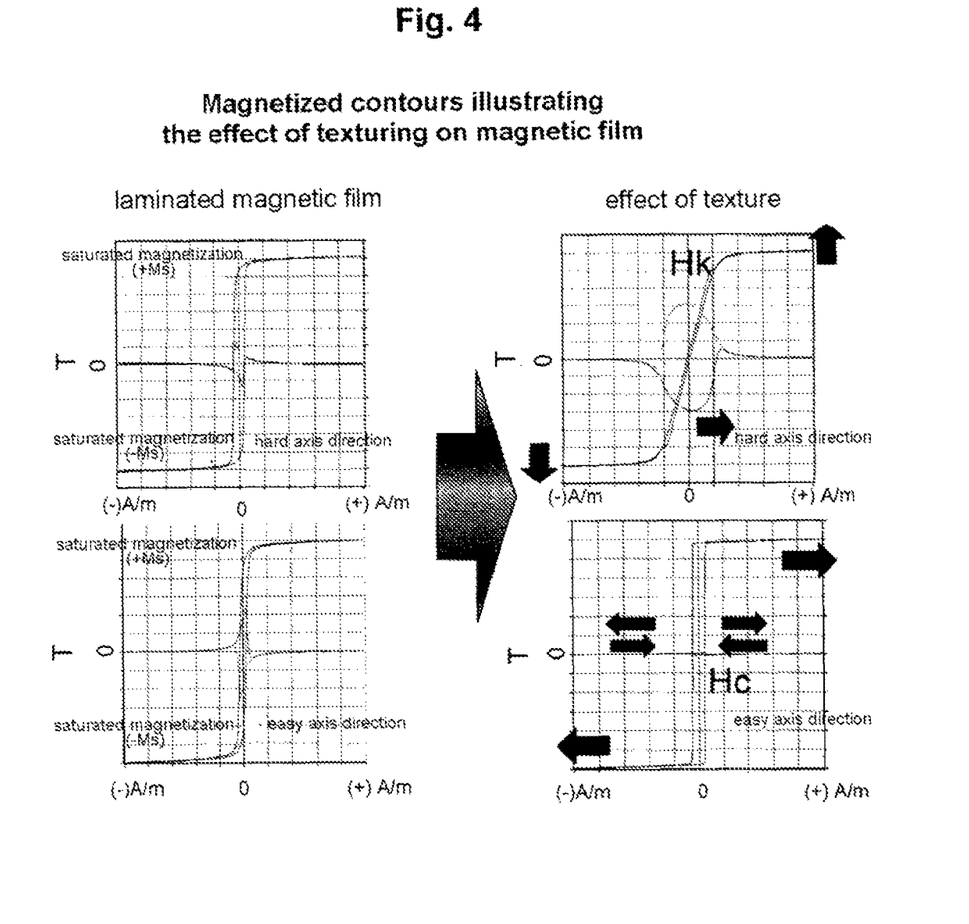
FIG. 4 shows magnetization contours illustrating the effect of texture on the magnetic film, according to one embodiment.

FIG. 4 shows magnetization contours of the effect of texture on magnetized film, according to some approaches. On the left, the figures show magnetization contours for the hard axis and laminated magnetized films in the easy direction (with the external magnetic field applied in a direction parallel to the anisotropy), and on the right, the figures show the magnetization contours for the hard axis and laminated magnetized films in the easy direction on a substrate to which the texture has been applied. Keys have been used in the figures to indicate anisotropic magnetic fields (Hk) and coercive force (Hc).

For the magnetic film laminated on a substrate with texture applied, with the magnetization contour in the hard axis direction, magnetization increases linearly from an external magnetic field state of 0 A/m, with an anisotropic magnetic field (Hk) occurring which expresses the strength of the magnetic field trying to align itself in the direction of a spin showing that the external magnetic field has reached a fixed value at saturation with the spin completely rotated through 90°. In the easy axis direction, the coercive force (Hc) increases expressing the strength of the magnetic field required to reverse the direction of magnetization, and a magnetization contour appears to which a uniaxial anisotropy has been applied.

Figure 5:
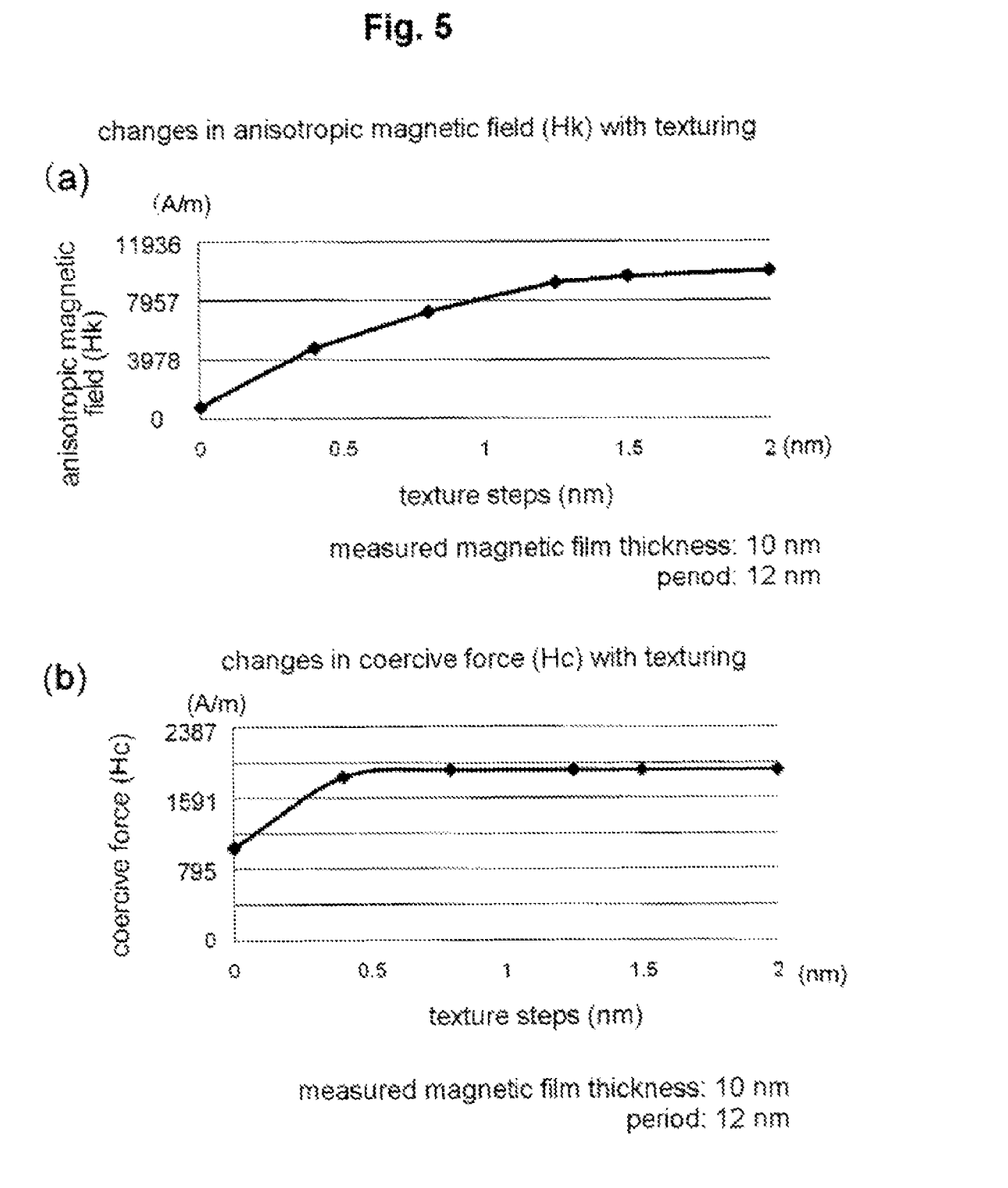
FIG. 5 shows changes in the uniaxial anisotropy and coercive force with damage to the texture, according to one embodiment.

FIG. 5 shows changes in the coercive force and anisotropic magnetic field due to the texture, according to some embodiments. It shows anisotropic magnetic field (Hk) and coercive force (Hc) on the Y-axis and texturing steps on the X-axis. It should be noted that the film thickness of the magnetic body measured was about 10 nm and the period of the texturing was similar to the sputter particle diameter for the magnetic film at about 12 nm.

The anisotropic magnetic field (Hk) is dependent on crystal structure and alignment and is the energy required for fixing in the determined spin direction, and is defined as $Hk=2 \cdot KU/Ms$, where Hk is the anisotropic magnetic field, KU is the crystal magnetic anisotropic constant, and Ms is the size of the saturated magnetization.

With the measured materials in FIG. 5(a), when the magnetized body and volume is fixed and the Ms value is at a set level, the anisotropic magnetic field increases due to the steps in the texture depending on changes in the KU value with the texture, and when the steps in the texture exceed about 1.5 nm, the crystalline structure and alignment which decide the KU value is fixed and changes in the anisotropic magnetic field can be expected to be reduced.

FIG. 5(b) shows changes in the coercive force due to the texture according to some embodiments, the coercive force changing due to such factors as the shape, structure, and magnetic domain structure as magnetic reversals can easily occur. However, through the application of texture, coercive force increases due to changes in the magnetic domain which is one factor which determines the coercive force, and when the magnetic domain is fixed, the coercive force transfers as a fixed value. FIGS. 5(a), 5(b) show that the magnetic domain is controlled with anisotropy applied.

With the texture steps applied to control the magnetic domain in the subsidiary magnetic pole layer 5, it is desirable to determine the film thickness for the subsidiary magnetic pole 5 by synchronizing the anisotropic magnetic field (Hk) of the magnetization contour of the write magnetic pole layer 1 with the anisotropic magnetic field (Hk) at the thickest part of the film in the height wise direction of elements from the magnetic layer portion in which the film thickness in the subsidiary magnetic pole layer 5 changes in a stepped or tapered fashion in the height wise direction of elements from the floating surface side, as at above about 0.4 nm saturated magnetism (Ms) with spin completely rotated through 90°, is determined by the volume of the magnetic body.

According to the magnetization contour for the write magnetic pole layer 1 in FIG. 3, when writing to recording medium 11 for example, the spin rotates completely through 90° as the antiferromagnetic coupling breaks off following an increase in the magnetic field induced in the coil, and flux is discharged to the recording medium. At this time, it is preferable that the subsidiary magnetic pole layer 5 be set smaller than the anisotropic magnetic field shown in the magnetization contour for the write magnetic pole layer 1 in order to supply flux to the write magnetic pole layer 1 as the saturated magnetization of the write magnetic pole layer 1 is speeded up, and that the anisotropic magnetic field of the subsidiary magnetic pole layer 5 be set greater than the external magnetic field range shown by the magnetization contour for the antiferromagnetic coupling of the write magnetic pole layer 1 to avoid any influence on the antiferromagnetic coupling of the write magnetic pole layer 1.

With the subsidiary magnetic pole layer 5, whose magnetic domain is controlled by the spin, is rotated through 90° as the magnetic flux generated in the vicinity of the write magnetic pole layer 1 through the antiferromagnetic coupling of the write magnetic pole layer 1 is absorbed, erasure of data after writing due to leakage of the magnetic flux can be prevented as the magnetic domain is controlled in line with the texture.

Figure 6:
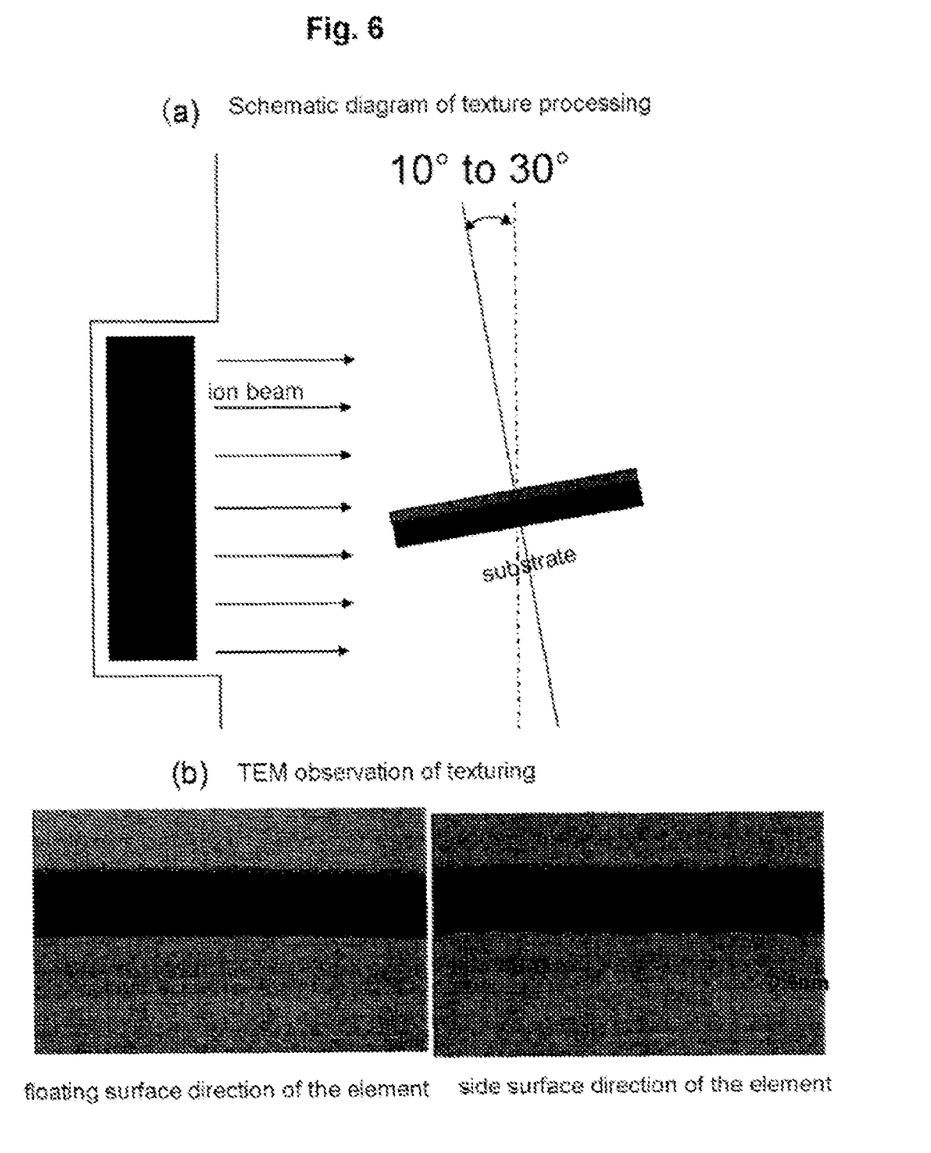
FIG. 6 shows a TEM observation and process patterns for textual damage, according to one embodiment.

FIG. 6 is an outline drawing which explains a method of processing the texture, according to one embodiment. FIG. 6(a) is a schematic diagram showing the texturing process, according to one embodiment. FIG. 6(b) is a diagram showing a substrate laminated with a magnetic layer on which texture has been applied to a non-magnetic film of $Al_2O_3$ seen through a TEM (Transmission Electron Microscope), according to one embodiment.

For example, with the alignment of the ion beam source and the substrate, the ion beam is irradiated from a perpendicular direction onto the easy axis of the magnetic body laminated on the substrate to which the function of the main magnetic pole is given. By repeating a cycle in which the substrate is rotated through 180° and the ion beam irradiated, a step-shaped texture can be formed in the hard axis direction, according to one embodiment.

Where the ion beam faces the direction of a thickness of the substrate, the angle at which the ion beam is irradiated on the substrate surface is a low angle, and in addition to using ion beam radiation in which the side surface is easy to process, it is desirable to use a low etching speed given that the anisotropic magnetic field cannot be increased to enlarge the step size of the texture, according to one embodiment.

FIG. 6(b) shows the results of a TEM observation of a position corresponding to the side surface of the elements and the floating surface of the elements opposing the recording medium where the elements are processed by sputtering from the substrate, according to one embodiment. No texturing is observed in the direction of the floating surface elements as it was observed to be flat, but observation from the direction of the side surface elements showed that the $Al_2O_3$ film had a texture with a step size of about 0.9 nm and a period of about 12 nm, with the texture being formed uniformly in a stepped shape in the hard axis direction and transferred to the top layer of the magnetic film, according to one embodiment.

A description follows of the method of manufacturing the recording head section of a perpendicular magnetic recording head, according to one embodiment. FIGS. 2 and 6 may be used to describe the following processes in turn for the manufacturing methods subsequent to the stage where flattening has been performed using a CMP process.

A method of manufacturing a perpendicular magnetic recording head, according to one embodiment, is described below.

In one step, a magnetic layer and a non-magnetic conducting layer are sequentially laminated on a substrate. In another step, a texture is applied by repeatedly irradiating a substrate with an ion beam in two directions, a first direction being of the floating surface, and rotated through 180° in the height wise direction of the elements. In another step, the magnetic film is laminated which forms the subsidiary magnetic pole layer 5.

In a further step, the magnetic film formed on the substrate is processed to form the main magnetic pole, the main magnetic pole comprising a subsidiary magnetic pole layer 5 and a write magnetic pole layer 1 for recording with a throat height section and a flare section. In another step, a non-magnetic layer is formed so as to surround the main magnetic pole, and a magnetic layer section is formed in which the subsidiary magnetic pole layer 5 becomes thicker toward an upper portion in a stepped or tapered fashion in the height wise direction of the elements from the floating surface facing the recording medium. In another step, a magnetic layer is formed which becomes the shield 32 via the non-magnetic layer.

FIG. 2 is an outline cross-section view showing an example of an embodiment of the recording head of the perpendicular magnetic recording head. As shown in FIG. 2(a), after manufacturing the lower layer coil 8 and the yoke magnetic pole 7, the write magnetic pole layer 1 is laminated onto a substrate which has been flattened using a CMP process using the sputtering method, with a magnetic field being applied to determine the direction of the easy axis.

As shown in FIG. 2(b), write magnetic pole layer 1 has a structure in which the first magnetic layer 1b, the non-magnetic thin-film conductor 1c, the second magnetic layer 1a and the non-magnetic cap layer 1d are laminated in sequence. For the first magnetic layer 1b, a single layer film or a laminated magnetic body with a high saturated flux density may be used comprising at least two of the elements of Co, Ni, Fe, etc., for example. A non-magnetic thin-film conductor 1c is a film inserted to generate antiferromagnetic coupling between the first magnetic layer 1b and the second magnetic layer 1a, and may, for example, be a non-magnetic thin-film conductor comprising Cr, for example, with a film thickness of less than about 1 nm. For the second magnetic layer 1a, a single film layer or a laminated film layer of a magnetic body having a high saturated flux density may be used comprising at least two elements of Co, Ni, Fe, etc., for example, with a composition which allows antiferromagnetic coupling to occur easily with first magnetic layer 1b. Anti-magnetic cap layer 1d is provided to protect the edges of the trailing side of the main magnetic pole 1, and can employ a single layer or laminated layers of oxides and nitrides of materials, such as Al, Si, Ta, Ti, etc., or a single layer or laminated layers of non-magnetic metals, such as Cr, NiCr, Rh, Mo, Nb, Au, etc. After lamination of cap layer 1d, a thermal process is carried out to stabilize the write magnetic pole layer 1.

A texture may now be applied to the cap layer 1d.

FIG. 6 is a diagram which shows the process of texturing schematically, according to one embodiment. An ion beam is irradiated from a perpendicular direction onto the easy axis of the magnetic layer of the write magnetic layer pole 1 which is laminated on the substrate facing the ion beam source. For example, a step-shaped texture can be formed in the hard axis direction by repeated cycles of irradiation of between about 10 seconds and about 30 seconds, rotating the substrate through 180° and irradiating the ion beam with the substrate in a fixed position for between about 10 seconds and about 30 seconds. For the angle of ion beam irradiation, in addition to using an ion beam irradiation angle which makes it easy to process the side surface rather than the surface of the film being processed, using a low oblique angle from between about 10° to about 30° for the angle of processing of the substrate, given that the anisotropic magnetic field cannot be increased to enlarge the step size of the texture, it is desirable to employ ion beam irradiation which is stable below an etching speed of about 0.3 nm/second.

Next, as shown in FIG. 2, the magnetic layer which will become the subsidiary magnetic layer 5 is laminated onto the cap layer 1d to which texture has been applied, and is coated with photo-sensitive photoresist, according to one embodiment. Using photolithography, according to one embodiment, the photo sensitive photoresist is patterned onto the main magnetic pole shape having a flare section which leads the magnetic field induced by the coil and a throat height section which determines the writing width to the floating surface creating an etching mask for processing with ion milling. By using the ion milling process, the magnetic layers for the write magnetic layer 1 and the subsidiary magnetic pole layer 5 are formed in the shape of the main magnetic pole, comprising the throat height section and the flare section. With the side surface of the main magnetic pole, the shape of the floating surface facing the recording medium 11 is processed to a reverse trapezoid shape so as not to erase data on the track adjacent to the track being written when the slider on which the magnetic recording head is mounted moves across recording medium 11, giving a magnetic escape angle to the neighboring track.

Next, in the process of forming the side gap layer on shield 32, a non-magnetic layer is laminated over the whole surface to surround the main magnetic pole comprising the write magnetic pole layer 1 and the subsidiary magnetic pole layer 5. For achieving lamination, it is preferable, according to one embodiment, to use a machine with good attachment to the pattern side walls such as a carousel-type sputter device, an ion beam deposition device, a CVD device (chemical vapor deposition) or an ALD device (Atomic Layer Deposition). For the film thickness of the laminated non-magnetic layer, the non-magnetic layer laminated on the trailing edge of subsidiary magnetic pole layer 5 uses an ion milling process with the main magnetic pole and the side shield 32 as the side gap interval, and with the quantity of processing greater on the upper surface than the pattern side surface with an ion incidence angle of about 45° to about 60°. The non-magnetic layer is removed until the magnetic body at the trailing side of subsidiary magnetic pole layer 5 is exposed, leaving the non-magnetic layer only on the side surface of the main magnetic pole forming the side gap layer of shield 32.

Photo-sensitive photoresist is then coated onto the exposed surface of the magnetic layer of subsidiary magnetic pole layer 5, according to one embodiment. Using a photolithography method, according to one embodiment, photo-sensitive photoresist is patterned on so that there is masking in excess of about 100 nm in the height wise direction of elements from the presumed position of the floating surface after sputter processing, creating an etching mask for the ion milling process. To form the subsidiary magnetic pole layer 5 with a magnetic layer portion which gets thicker towards the height wise direction of elements from the floating surface facing the recording medium in a stepped or tapered fashion using an ion milling technique, an ion beam is used which irradiates from the height wise direction of the elements enabling a surface which the ion beam covers 100% and a surface which the ion beam does not reach due to the shadow of the height of the etching mask. Also, by rotating the substrate to the left and the right, the floating surface side of the subsidiary magnetic pole layer 5 is processed so that it changes with the ion beam irradiating directly below the etching mask at 0% and the ion beam irradiation facing the floating surface at 100%. After processing of the slider, gap layer 1d with the texture applied is removed from the position presumed for the floating surface exposing the magnetic layer of the write magnetic pole 1.

Shield 32, which controls the performance of the main magnetic pole according to one embodiment, is then formed with a pattern using electroplating via a non-magnetic layer so that it surrounds the main magnetic pole. As a contact layer for the electroplating electrode, and as a non-magnetic contact layer functioning also as the shield gap on the trailing side of the main magnetic pole, it is possible to use a single layer or a laminated layer of oxides and nitrides of Al, Si, Ta, Ti, etc., or a single layer or laminated layers of non-magnetic metals, such as Cr, NiCr, Rh, Mo, Nb, etc. The electrode layer may, for example, use a single or a laminated layer of a magnetic material including at least two elements of Co, Ni, Fe, etc. Using photolithography on the electrode layer, a pattern for shield 32 is formed using a photo-sensitive resist, with shield 32 being formed using the electroplating method. After plating the shield 32, the resist is removed, and the electrode layer is removed by ion milling, according to one embodiment. Flattening is then performed with a CMP process to form the upper layer coil 2, a protective film is formed to surround the coil, and the return pole 3 is formed, according to one embodiment.

Although a texture is applied to the cap layer 1d, according to the previous embodiment, the same effect in controlling the magnetic domain of the subsidiary magnetic pole layer 5 can be obtained by applying textural damage of more than about 5 nm and less than about 10 nm to the initial laminated layer of the subsidiary magnetic pole layer 5, with the remainder of the film thickness then laminated.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording head, comprising:
   a main magnetic pole, comprising:
      a write magnetic pole layer for recording, the write magnetic pole layer comprising magnetic layers being antiferromagnetically coupled via a thin non-magnetic conductor layer between the magnetic layers, wherein the write magnetic pole layer for recording has a flare section which gradually widens toward a top of the main magnetic pole in a height wise direction of a throat height section;

a non-magnetic cap layer laminated above an uppermost layer of the write magnetic pole layer, the non-magnetic cap layer being textured to provide anisotropy; and a subsidiary magnetic pole layer for supplementing the recording laminated above the non-magnetic cap layer;

an auxiliary magnetic pole;

a magnetic shield positioned via a non-magnetic layer on a trailing edge of the main magnetic pole and on both sides of the main magnetic pole in a track width direction; and a coil for generating a recording magnetic field.

2. The perpendicular magnetic recording head of claim 1:

wherein texture is applied to the non-magnetic cap layer on a trailing side of the write magnetic pole layer for recording, and wherein a magnetic film of the subsidiary magnetic pole layer is laminated.

3. The perpendicular magnetic recording head of claim 1, wherein the non-magnetic cap layer comprises a non-magnetic thin film.

4. The perpendicular magnetic recording head of claim 1, wherein the surface of the non-magnetic cap layer is textured in a physical process with an ion beam.

5. The perpendicular magnetic recording head of claim 1:

wherein the subsidiary magnetic pole layer has a magnetic film thickness greater than a range of antiferromagnetic coupling of the write magnetic pole layer for recording, and wherein an anisotropic magnetic field of the subsidiary magnetic pole layer is smaller than an anisotropic magnetic field of the write magnetic pole layer for recording with texture steps larger than about 0.4 nm.

6. The perpendicular magnetic recording head of claim 1, wherein the subsidiary magnetic pole layer has a magnetic layer section which widens in a stepped or tapered fashion in a height wise direction from a floating surface facing a recording medium.

7. A system, comprising:

a magnetic storage medium;

at least one head as recited in claim 1 for reading from and/or writing to the magnetic medium; and a control unit coupled to the head for controlling operation of the head.

8. A method for manufacturing a perpendicular magnetic recording head, the method comprising:

sequentially laminating a magnetic layer and a non-magnetic conducting layer on a substrate;

applying a texture by repeatedly irradiating the substrate with an ion beam in two directions, a first direction being a floating surface direction, and a second direction being rotated through 180° in a height wise direction;

laminating a magnetic film to form a subsidiary magnetic layer;

processing the magnetic film formed on the substrate to form a main magnetic pole, the main magnetic pole comprising:

a subsidiary magnetic pole formed via a magnetic layer section which causes the subsidiary magnetic pole layer to become thicker toward an upper portion of the subsidiary magnetic pole layer in a stepped or tapered fashion in a height wise direction from a floating surface facing a recording medium; and a write magnetic pole layer for recording having a throat height section and a flare section; and forming a non-magnetic layer which surrounds the main magnetic pole followed by a magnetic shield layer via the non-magnetic layer.

9. The method of claim 8, further comprising forming a non-magnetic cap layer above an uppermost layer of the write magnetic pole layer, the non-magnetic cap layer being textured to provide anisotropy.

10. The method of claim 9, wherein texture is applied to the non-magnetic cap layer on a trailing side of the write magnetic pole layer for recording.

11. The method of claim 9, wherein the surface of the non-magnetic cap layer is textured in a physical process with an ion beam.

12. A magnetic recording and playback device, comprising:

a perpendicular magnetic recording medium;

a motor which rotates the perpendicular magnetic recording medium;

a magnetic head having a recording head and a playback head, the recording head comprising:

a main magnetic pole, the main magnetic pole comprising:

a subsidiary magnetic pole layer; and a write magnetic pole layer for recording, wherein the write magnetic pole layer for recording has a flare section which gradually widens toward a top in a height wise direction of a throat height section, wherein the write magnetic pole layer for recording is provided with anisotropy via antiferromagnetic coupling of magnetic layers with a thin film non-magnetic body therebetween;

an auxiliary magnetic pole;

a magnetic shield positioned via a non-magnetic layer on a trailing edge of the main magnetic pole and on both sides of the main magnetic pole in a track width direction; and a coil for generating a recording magnetic field from the main magnetic pole; and a head drive section which drives the magnetic head to a desired track position of the perpendicular magnetic recording medium, wherein the main magnetic pole comprises laminated magnetic bodies having two different anisotropic magnetic field strengths, wherein the subsidiary magnetic pole layer has a section which widens in a stepped or tapered fashion in a height wise direction from a floating surface facing the perpendicular magnetic recording medium, and wherein the subsidiary magnetic pole layer is provided with anisotropy through texturing.

* * * * *